April 18, 1939.  A. D. SABORSKY  2,154,702
OVERHEAD TRACTOR
Filed Sept. 24, 1934  2 Sheets-Sheet 2
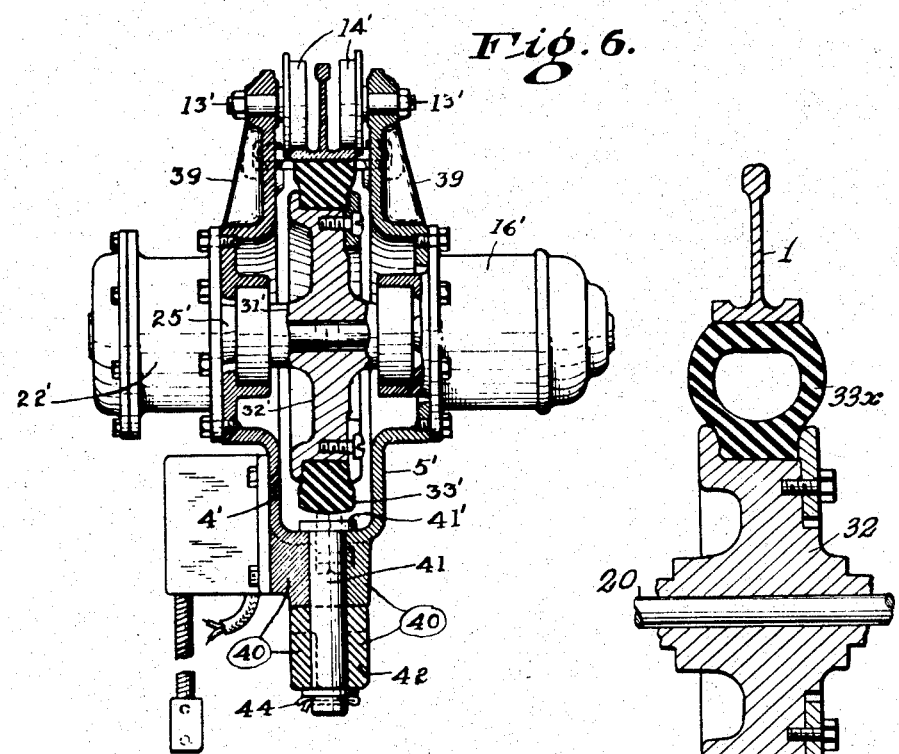
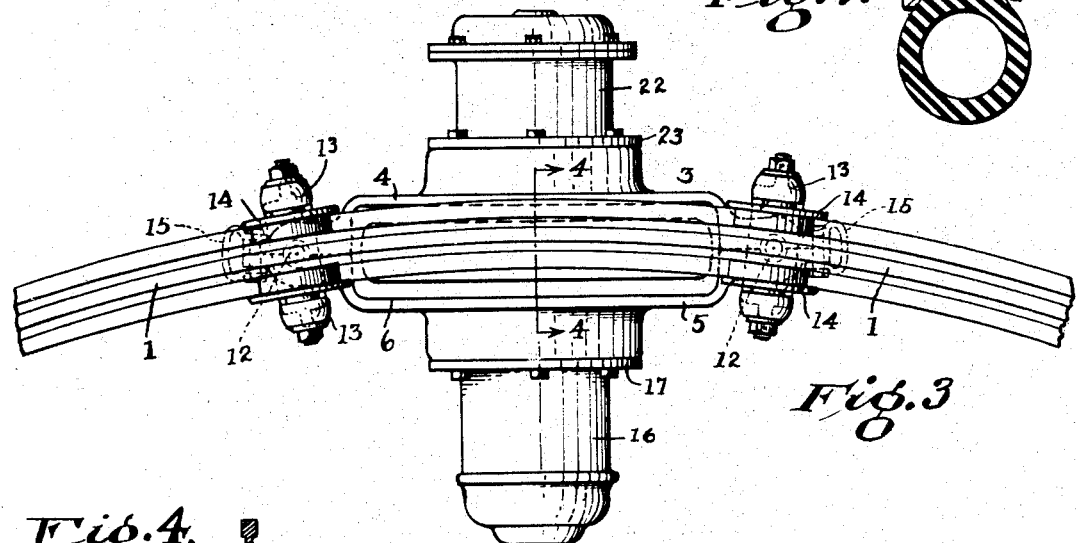
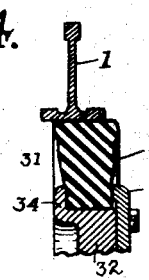
INVENTOR.
ARTHUR D. SABORSKY.
BY
ATTORNEY.

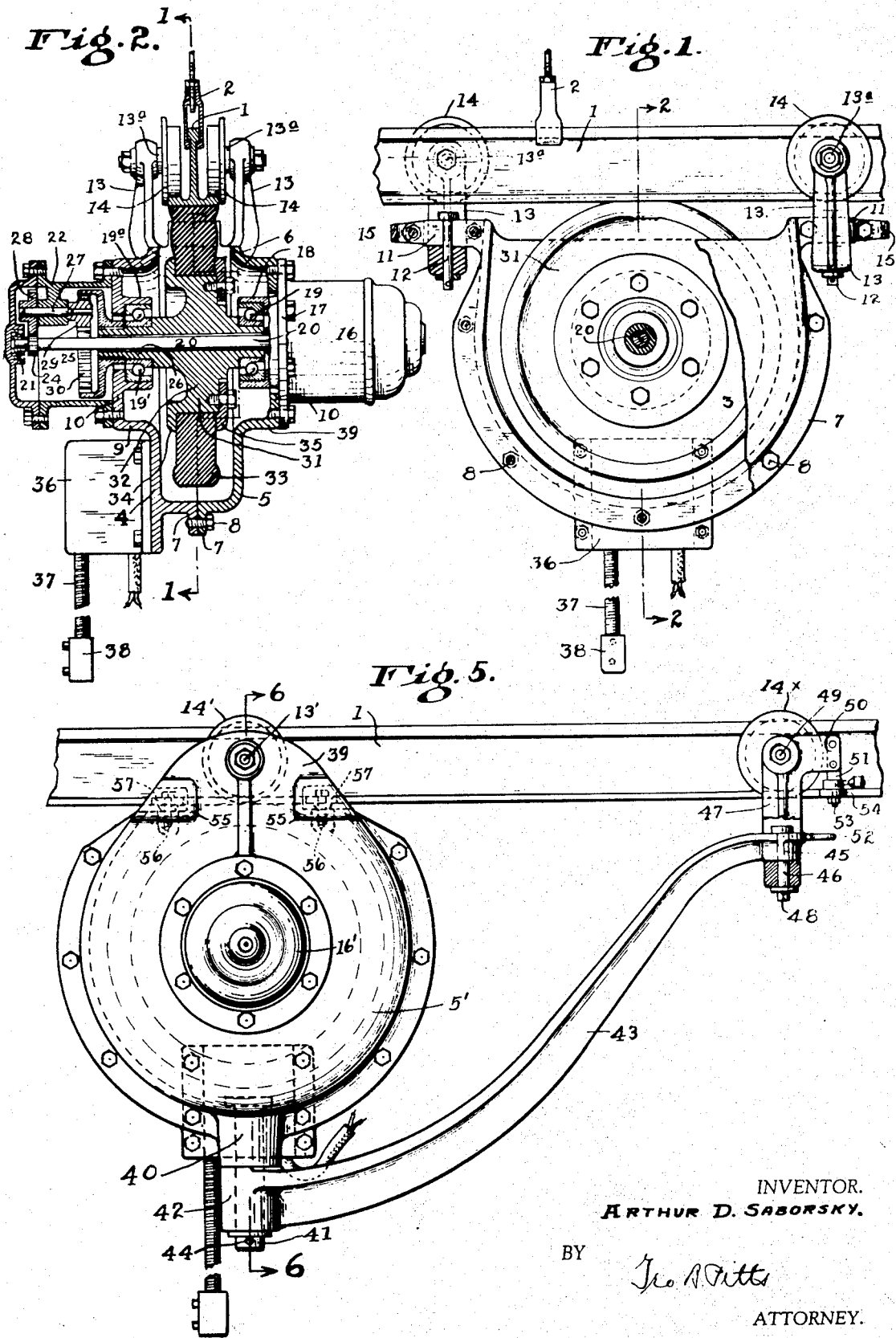

Patented Apr. 18, 1939

2,154,702

UNITED STATES PATENT OFFICE 2,154,702

OVERHEAD TRACTOR

Arthur D. Saborsky, Lakewood, Ohio

Application September 24, 1934, Serial No. 745,345

8 Claims. (Cl. 105—153)

This invention relates to a motor driven tractor, load carrier or hoist mechanism of the type that travels on an overhead material handling system. The embodiment herein disclosed is illustrated for engagement with and suspension from a steel rail (ordinarily termed a monorail or tramrail), shown substantially T-shaped in cross section, providing trackage for one or more wheels or one or more pairs of wheels and a traction surface for a driven traction wheel.

In the construction of devices of this character, of which I have knowledge, it has been the practice to interpose between the traction wheel and the supporting wheels a spring or springs, whereby the traction wheel was maintained in yielding engagement with the rail to insure traction effort or effect. This involved extra parts and increased the size of the mechanism. Also, in such arrangement and with solid metal traction wheels, the curved portions of the rail had to be curved about a relatively long radius to prevent the tread of the traction wheel from disengaging the rail when negotiating curved portions thereof, and further to prevent excessive lateral frictional resistance between the traction wheel and the rail.

One object of the invention is to provide an improved overhead load propelling device of this character of simple construction adapted to insure adequate traction with a supporting rail in a simplified manner, whereby positive and efficient driving effect results.

Another object of the invention is to provide an improved device of this character of simple construction adapted to insure adequate traction between the driven traction wheel and a supporting rail in a simplified manner and to permit the rails to be curved on a relatively small radius to meet varying conditions in propelling various loads along the rail.

Another object of the invention is to provide an improved device of this character having a driven resilient traction wheel arranged to flex laterally to accommodate itself to curvalinear portions of the rail, whereby slippage, and waste of power or current are substantially reduced.

Other objects of the invention will be apparent to those skilled in the art to which my invention relates from the following description taken in connection with the accompanying drawings, wherein Fig. 1 is a view (partly in elevation and partly in section) of a device embodying my invention, the device being shown supported by and suspended from a rail.

Fig. 2 is a section on the line 2—2 of Fig. 1.

Fig. 3 is a plan view showing the device negotiating a curved portion of the rail.

Fig. 4 is a fragmentary section on the line 4—4 of Fig. 3.

Fig. 5 is an elevational view showing a different embodiment of the invention.

Fig. 6 is a section on the line 6—6 of Fig. 5.

Fig. 7 is a fragmentary section substantially similar to Fig. 2, but illustrating another modification.

My invention herein disclosed may be embodied in a motor driven tractor, load carrier or hoist as used in the overhead material handling industry, but for illustrative purposes I have shown it applied to or embodied in a tractor, as being the preferred application of the invention; accordingly, the term tractor or device herein used is for the purpose of description and not for purposes of limitation.

In the drawings, 1 indicates the rail suitably supported by spaced hangers 2, only one being shown (see Fig. 1). 3 indicates as an entirety the main frame of the tractor comprising oppositely related frame sections 4, 5, forming a housing and shaped to form between them, at their upper ends, an opening 6 for a purpose later set forth. The sections 4, 5, are of general curvalinear shape, the side and lower edges thereof being provided with outwardly extending flanges 7 which are secured together by bolts or cap screws 8. Each section 4, 5, is formed in its side wall with an opening 9 alined with the opening 9 in the other section. The wall of each section forming the opening 9 therein extends laterally outwardly, to provide adequate space within the housing, and such wall is provided at its outer end with an inturned peripheral flange 10, the purpose of which will later be set forth. At its opposite upper ends, each section 4, 5, is provided with outwardly extending arms 11, which engage the arms 11 of the other section. The opposed walls of the arms 11 are formed with semi-circular recesses which serve to receive pivot pins 12, the heads of the pins resting on the upper edges of the arms 11. The lower ends of the pins extend through the central portions of inverted U-shaped wheel supporting frames 13 to permit the latter to swivel. The free ends of the wheel frames 13 are provided with inwardly extending shafts 13a on which are suitably mounted wheels 14 arranged to engage and run on the rail 1, as shown. As will be understood, the wheels 14 movably support the frame 3 on the rail 1, the pivot pins 12 permitting the frames 13 to swivel when the wheels 14 traverse or negotiate curved portions of the rail 1 as shown in Fig. 3. The outer ends of the arms 11 carry suitable devices 15, such as loop shaped members, which serve as bumpers and also as coupling elements to be connected to a load carrier (not shown).

16 indicates an electric motor. The housing of the motor adjacent its inner end is provided with a flange 17 which is rigidly secured by bolts to the flange 10 of the frame section 5. The inner end of the motor casing is provided with an inwardly extending collar 18 which forms the seat for the outer race of an anti-friction bearing 19. 19' indicates an anti-friction bearing carried by the frame section 4 and axially related to the bearing 19. The outer race of the bearing 19' is mounted in a seat provided by a collar 19a extending inwardly from and spaced from the free edge of the adjacent flange 10. The purpose of the bearings 19, 19', will later appear. The shaft 20 of the motor 16 extends through the openings 9 formed in the sections 4, 5, the outer end of the shaft being mounted in an anti-friction bearing 21 mounted on the end wall of a casing 22. The inner end of the casing is open and provided with a flange 23 which is suitably secured to the flange 10 on the frame section 4. The motor shaft 20 is provided with a pinion 24 which transmits the power of the motor 16 through a suitable reduction gearing 25, within the casing 22 to drive a hollow shaft 26, to be later referred to, mounted in the bearings 19, 19', the shaft 26 being made hollow to accommodate the motor shaft 20, as shown.

The reduction gearing 25 may be of any desired construction, but preferably comprises the following: 27 indicates a shaft mounted in and extending through a suitable bearing provided on the side of the casing 22 therewithin. The outer end of the shaft 27 carries a gear 28 in mesh with the pinion 24. The inner end of the shaft 27 carries a pinion 29 in mesh with a gear 30 which is splined or keyed to the adjacent end of the shaft 26. The casing 22 is of sectional construction for assembly and disassembly purposes.

31 indicates as an entirety a traction wheel which is driven by the shaft 26 and extends, at its upper portion, through the opening 6 between the frame sections 4, 5, for engagement with the rail 1. The traction wheel 31 comprises an inner or web section 32, preferably formed integrally with the shaft 26, and a resilient or yieldable annular section 33, which preferably forms the outer section of the wheel and accordingly normally resiliently or yieldingly engages the traction surface of the rail 1. The wheel section 33 is shown as consisting of an annulus formed of rubber or rubber compound, which permits it to be compressed and also flexed, whereby it engages yieldingly and under pressure the rail 1 and its portions outwardly of the wheel section 32 may readily yield or flex laterally in either direction, for example, while being driven so that its rail engaging surface will remain in traction engagement with the rail as the tractor negotiates curved portions thereof. The rubber section 33 is fixed to the inner wheel section 32 to rotate therewith and resiliently engages the rail 1 to insure effective traction therewith when driven. As shown, the shaft 26 is so mounted on the frame 3 with respect to the rail 1, that the resilient section 33 of the wheel 31 is compressed at or along that portion which is in engagement with the rail 1 and hence is always under pressure engagement therewith.

The rubber section 33 snugly but removably fits the peripheral side wall of the section 32 against a circumferential flange 34 on one edge thereof and is secured against the flange by a removable ring 35. In the event the rubber section 33 wears away or greater pressure engagement with the rail 1 is found desirable, it may be removed and a new one substituted. While the rubber section 33 is shown of substantially rectangular cross section, it may be otherwise constructed to secure any desired resiliency; for example, it may be made hollow or formed with transverse openings throughout its circumference or it may be formed in sections. The ring 35 is removably held in position by suitable bolts threaded into the web section 32.

My construction of traction wheel is advantageous as it insures adequate frictional engagement of the supporting wheels and traction wheel with the rail 1 at all times and enables the tractor to be simplified in construction and cost of manufacture reduced for the reason that the frame 3 does not have to be spring-mounted with respect to the wheels 14. It will be noted that while the axis of the traction wheel is fixed relative to the frame, it has a fixed relation to the axes of the trolley wheels as well as to the under face of the rail, this axis being preferably spaced below the rail a distance less than the normal radius of the wheel and tire, so that the latter will be flattened or distorted as shown in Figs. 1, 2 and 6 to form an enlarged area of contact with the under side of the rail when the wheel and rail are in assembled position and insure adequate frictional contact of the tire with the rail. Accordingly, springs are not required to effect yielding or pressure engagement of the wheel with the rail. Furthermore, when the tractor traverses curved portions of the rail 1, as shown in Fig. 3, the resiliency of the rubber section permits its outer circumferential portion to flex laterally, as shown in Fig. 4, so that its peripheral wall, due to its frictional engagement with the rail, remains in engagement therewith without undue lateral sliding on the rail. Accordingly, tractive effort is continuously maintained throughout the curved portions of the rail without undue loss of power or waste of current. Due to this characteristic advantage, the rail may be curved on smaller radii, where such conditions are found desirable, without danger of the traction wheel disengaging the rail, the result of which would stall the tractor and/or permit racing of the motor.

36 indicates a box containing suitable electrical controls for the motor 16 and mounted in a well-known manner on the outer wall of the section 4. 37 indicates a conduit depending from the box 36 and enclosing leads connected to the contacts of a push button switch 38 at the lower end of the conduit 37.

Figs. 5 and 6 show an embodiment of the invention in which the axis of the traction wheel extends in a vertical plane cutting the axes of one pair of supporting wheels. In this arrangement, the shafts for one pair of supporting wheels may be relatively stationary and the removable resilient section of the traction wheel may be reduced radially, if desired (as shown). Referring to these figures, 4', 5', indicate the frame sections which are substantially similar to the sections already referred to except that they are shaped to provide (a) integral up-standing arms or hangers 39 and (b) integral depending members 40. The arms 39 support shafts 13' for one pair of supporting wheels 14'. The depending members 40 are arranged side by side and formed on their opposed faces with semi-circular recesses to provide a bearing for a swivel pin 41. The pin 41 extends through the bearing and the hollow boss 42 on the adjacent end of a tail member 43. The upper end of the pin 41 is provided with a head 41' which engages the members 40 to support the pin in position; its lower end is provided with a suitable device, such as a cotter pin 44, preferably engaging a washer, to hold the tail member 43 on the pin and connect it to the sections 4', 5'. The opposite end of the tail member 43 is provided with an opening 45 through which a pivot pin 46 extends, the pin also extending through the central portion of a substantially U-shaped wheel supporting frame 47 to permit the latter to swivel on the pin. The pin 46 is provided with a head which engages the upper face of the tail member to support the pin in the opening 45; its lower end is provided with a suitable device, such as a cotter pin 48, preferably engaging a washer, to hold the frame 47 to the tail member 43. The arms of the member 47, at their free ends, are provided with inwardly extending shafts 49 which support a pair of supporting wheels 14x. The arms of the member 47 are provided with outwardly extending lugs 50 to which is fixed a bracket 51. The bracket 51 supports a pair of depending shafts 53 for rollers 54 which engage the opposite lateral sides of the rail 1, as shown. 52 indicates a coupling element preferably provided on the rear end of the tail member 43. Likewise, each frame section 4', 5', is formed with recesses 55 in which are suitably mounted shafts 56 carrying rollers 57 arranged to engage the opposite lateral sides of the rail 1 as shown.

The construction and mounting of the motor 16', casing 22', reduction gearing 25', shaft 26' and traction wheel 31' are similar to like parts shown in Figs. 1, 2, 3 and 4, except that the resilient section 33' need not be so constructed as to provide lateral flexibility, this construction being permissible as the traction wheel engages the rail at the same point as the adjacent pair of supporting wheels 14' and turns therewith as the tractor traverses curved portions of the rail.

Fig. 7 illustrates a construction wherein the tire, indicated at 33x is of hollow form and surrounds the wheel section 32 so as to frictionally engage the rail 1.

From the foregoing description it will be noted that the frame is provided with wheels having axles which are non-yieldably supported and engage opposite portions of the rail. While certain of the wheels may, as shown in Figs. 1, 2 and 3, be mounted to swivel, whether they are so mounted or not, the axes of all the wheels have a relatively fixed relation to the frame; on the other hand one wheel (namely, the traction wheel in the disclosed embodiment) has a yielding circumferential portion, which is shown as engaging the rail, serving to effect pressure engagement of all the wheels with the rail.

To those skilled in the art to which my invention relates, many changes in construction and widely differing embodiments and applications of the invention will suggest themselves without departing from the spirit and scope of the invention. My disclosures and the description herein are purely illustrative and not intended to be in any sense limiting.

What I claim is:

1. In combination, a tramrail, an overhead tractor for propelling variable loads along said tramrail and provided with supporting wheels and arranged to run on top of the tramrail flanges, a traction wheel engaging the bottom side said tramrail flanges, said traction wheel having a non-metallic circumferential portion formed of resilient material permitting radial flexing thereof to exert pressure against the tramrail flanges and shaped in cross section to provide for lateral flexing as said wheel negotiates curved portions of said tramrail, the traction wheel and supporting wheels being mounted on said tractor in fixed relation to each other, whereby to maintain constant pressure on said tramrail between the said supporting wheels and the said traction wheel.

2. A traction device for moving variable loads along an overhead carrier system having a supporting rail, said device including a trolley having supporting wheels to run on a supporting rail of such a system, a rigid frame carried by said trolley, a traction wheel carried by the frame and having an axis maintained a fixed predetermined distance from the axes of the supporting wheels, said wheel having a periphery formed of deformable resilient material to engage frictionally with a fixed part of the system, said wheel being so positioned relative to said supporting wheels that the wheel periphery, when said device is assembled, will exert pressure against said fixed part of the system and thereby deform said wheel periphery, and means for driving the traction wheel and thereby moving variable loads along the system.

3. A traction device for moving variable loads along an overhead carrier system having a supporting rail, said device including a trolley having supporting wheels to run on a supporting rail of such a system, a rigid frame carried by said trolley, a wheel carried by the frame and engaging the under side of said rail, and having an axis maintained a fixed predetermined distance from the axes of the supporting wheels, means for driving one of said wheels and thereby moving variable loads along the system, said driven wheel having a deformable tire formed of resilient material, whereby, when the device is assembled the peripheral portion of said tire is deformed at the point of contact with the rail to effect frictional engagement therewith.

4. In a traction device for moving variable loads in an overhead carrier system, the combination with a supporting rail, of a trolley comprising a frame having spaced supporting wheels arranged to run on said supporting rail, a traction wheel carried by said frame and having a solid tire formed of resilient material arranged to frictionally engage with the under side of said rail and to flex laterally in either direction while negotiating curved portions of said rail, said traction wheel having its axis maintained in a fixed predetermined position relative to the axes of said supporting wheels, the distance of the axis of said traction wheel from said rail being less than the normal radius of said tire, and means for driving said traction wheel and thereby moving variable loads along said rail.

5. In a traction device for moving variable loads in an overhead carrier system, the combination with a supporting rail, of a trolley comprising a frame having spaced supporting wheels arranged to run on said supporting rail, a traction wheel carried by said frame and having a hollow tire formed of resilient material arranged to frictionally engage with the under side of said rail and to flex laterally in either direction while negotiating curved portions of said rail, said traction wheel having its axis maintained in a fixed predetermined position relative to the axes of said supporting wheels, the distance of the axis of said traction wheel from said rail being less than the normal radius of said tire, and means for driving said traction wheel and thereby moving variable loads along said rail.

6. In a traction device for an overhead carrier system, the combination with an overhead rail, of a frame, trolleys attached to the frame and having supporting wheels to run on and support the frame beneath said rail, a traction wheel having a solid tire formed of resilient material, the axis of said wheel being so positioned relative to the frame that, when the device is assembled with the rail, the tire will be distorted by and will exert substantially uniform pressure against the under surface of the rail throughout substantially its entire width, the resiliency of said tire providing for flexing thereof laterally in either direction in negotiating curved portions of said rail, and means connecting the frame and supporting wheels for preventing change vertically between the axis of the traction wheel and the axes of said supporting wheels.

7. In a traction device for moving variable loads along an overhead carrier system, the combination with a supporting rail, of a trolley having supporting wheels to run on said supporting rail, a rigid frame carried by said trolley, a wheel carried by the frame and engaging the under side of said rail, and having an axis maintained a fixed predetermined distance from the axes of the supporting wheels, means for driving one of said wheels and thereby moving variable loads along the system, said driven wheel having a deformable tire of non-metallic material arranged to engage frictionally with said rail and to flex laterally when the said wheel is negotiating curved portions of said rail.

8. A traction device for an overhead carrier system including a frame, trolleys attached to the frame and having supporting wheels to run on and support the frame beneath an overhead rail, a resilient, deformable tired traction wheel having its axis so positioned relative to the frame that, when the device is assembled with the rail, the tire will be distorted by, and will exert substantially uniform pressure against the under-surface of the rail throughout substantially its entire width, and means connecting the frame and the wheel for preventing change in position of the axis of the traction wheel relative to the rail when the device and rail are in assembled position.

ARTHUR D. SABORSKY.